United States Patent
Boetsch

(10) Patent No.: US 11,013,166 B2
(45) Date of Patent: May 25, 2021

(54) SEED DISPENSING DEVICE FOR SOWING MACHINES

(71) Applicant: DUPLISEEDTY, LLC, Miami, FL (US)

(72) Inventor: Gustavo Alejandro Boetsch, Villa Maria-Cordoba (AR)

(73) Assignee: DUPLISEEDTY, LLC, Miami, FL (US)

( * ) Notice: Subject to any disclaimer, the term of this patent is extended or adjusted under 35 U.S.C. 154(b) by 181 days.

(21) Appl. No.: 16/259,517

(22) Filed: Jan. 28, 2019

(65) Prior Publication Data

US 2020/0000018 A1   Jan. 2, 2020

(30) Foreign Application Priority Data

Jun. 28, 2018  (AR) .............................. P180101797

(51) Int. Cl.
*A01C 7/16* (2006.01)
*A01C 7/20* (2006.01)
*A01C 7/10* (2006.01)

(52) U.S. Cl.
CPC ................ *A01C 7/16* (2013.01); *A01C 7/105* (2013.01); *A01C 7/20* (2013.01)

(58) Field of Classification Search
CPC .... A01C 7/16; A01C 7/20; A01C 7/08; A01C 7/00; A01C 7/105; A01C 7/102; A01C 7/10
See application file for complete search history.

(56) References Cited

U.S. PATENT DOCUMENTS

| | | | | |
|---|---|---|---|---|
| RE28,207 E | * | 10/1974 | Wigham | ................... A01C 9/02 111/78 |
| 4,653,410 A | * | 3/1987 | Typpi | ....................... A01C 7/04 111/172 |
| 2015/0094916 A1 | * | 4/2015 | Bauerer | ................. A01C 21/00 701/50 |

* cited by examiner

*Primary Examiner* — Christopher J. Novosad
(74) *Attorney, Agent, or Firm* — Norris McLaughlin, P.A.

(57) ABSTRACT

A seed dispensing device for sowing machines that allows a continuous and synchronized sowing of seeds, depositing the seeds at the same separation distance, optimizing and thus providing a better sowing operation.

13 Claims, 9 Drawing Sheets

SEED DISPENSING DEVICE FOR SOWING MACHINES

FIELD OF THE INVENTION

The present invention relates to the field of devices, means and arrangements used in agroindustry, more particularly in the sowing machines, and more preferably it refers to a seed distributor or seed metering device which, unlike conventional metering devices, allows the grain to fall from the discharge conduit or pipe to the furrows in a constant and synchronized manner without there being alterations between the distances of seed sowing.

DESCRIPTION OF PRIOR ART

It is well known in the field of art that sowing machines comprise a chassis or main structure on which different components are assembled, such as set of conveyor wheels, central seed hopper, secondary hopper to supply the seed dispensing devices, sowing body mounted on a pipe transverse to the chassis, air blowing or suction turbine and other elements that are well known in the art and that for such reasons we will not go into descriptive details.

Regarding seed dispensing devices, there are seed dispensing devices of pneumatic nature that have a rotating plate that separates it into a negative pressurization or suction chamber and an operational chamber. Generally, seeds enter through a feed inlet, accumulate in a sector, are deposited on a few cavities provided on the plate and remain housed thanks to negative pressurization or suction generated by the vacuum chamber. Then, they reach a sector where the suction or negative pressurization is zero, falling by gravity to a discharge conduit and then to the furrow.

In turn, there is also a horizontal plate mechanical dispensing device used in sowing machines of coarse grains, furrow by furrow with minimum tillage (direct) and in conventional sowing, and with seed feeding by means of a gravity fall system or by air stream (seeds dragged by a positive air stream to the secondary hopper). Furrow seeding machines are designed to place the seeds some distance apart according to each type of seed. The sowing machines require depositing the seeds in the soil at a desired depth and with a uniform distribution among them. The sowing machine consists of a main hopper with a large load capacity, from which discharge hoses go down to the secondary hoppers where they receive seeds and the grain metering device dispenses them uniformly.

A horizontal plate mechanical seed metering device has a rotating plate located in the lower part of the secondary hopper. The plate is provided with cells called cavities which are evenly distributed in which seeds shall be retained. During its operation, the sowing plate is rotated on the counter plate and the dispensing device causes seeds that are contained in the cavities to enter. The leveling triggers regulate the entry of seed into the dispensing device, and the ejecting triggers let seeds fall on the discharge area of the counter plate and from here seeds fall by gravity through the discharge pipe towards the furrow.

Although Conventional seed metering or dispensing devices of the prior art have proven to work in practice, a number of drawbacks still occur. One of them is related to the fall of grain from the discharge pipe or conduit towards the respective furrow. At present, the continuous synchronization in the fall of grain from the discharge pipe to the furrow depends on the mechanism of the seed metering device, which has been previously described.

In practice, it usually happens that not always the fall of grain towards the furrow is carried out in a synchronized or constant way, many times certain misadjustments or interruptions occur between the fall of one seed and another seed. The misadjustments usually occur due to the collision of the seeds against the inner wall of the discharge pipe, causing any synchronization achieved by the seed metering device to be lost. Also, it may happen that due to the collision of the seeds against the inner wall of the pipe, a desynchronization occurs that causes two seeds to fall very close to each other and not at the correct distance at which they should be sown. Consequently, the distance between the sown seeds does not remain constant and this brings with it a great problem in relation to sowing regularity. On the other hand, it may happen that there is no grain fall from the discharge pipe due to its absence in the respective plate or related mechanism of the grain dispensing device, this being another drawback since sowing regularity would be lost. Both the lack of synchronization or interruption in the grain fall, as well as its absence in the respective metering device, are inconvenient in practice that have not yet been solved effectively.

By virtue of the current state of the art available for seed metering in the agroindustry, it would be very convenient to have a new arrangement being constituted and constructed to allow a fall of grain from the discharge pipe to the furrow in a synchronized and constant manner, without there being the drawbacks mentioned above.

BRIEF DESCRIPTION OF THE INVENTION

It is therefore an object of the present invention to provide a new seed dispensing device for sowing machines that allows the grain to fall from the discharge tube to the furrow, in a constant and synchronized manner.

It is also the object of the present invention to provide a seed dispensing device having a dispensing device that provides seeds in a constant manner.

It is also another object of the present invention to provide said metering device which is made to operate in a synchronized manner, guaranteeing constant seed fall without alterations or misadjustments or interruptions.

It is another object of the present invention to provide a metering device with synchronized double feed to allow constant falling of the seed.

It is still another object of the present invention to provide a seed dispensing device for sowing machines, of the type comprising a seed feeding inlet in communication with a seed container through which a seed metering device takes the seeds and discharges them into a discharge conduit whose outlet port is oriented towards the respective furrow previously made on the surface, wherein said dispensing mechanism comprises a pair of rotating plates independent form each other which are driven through a respective rotating shaft which, in turn, is driven through an electric motor, a plurality of arms radially arranged on the perimeter of each rotating plate, which have a distal end provided with at least one seed collecting means, at least two central gears independent from each other, rotably mounted between said rotating plates and driven by means of the corresponding rotating shaft, at least two parallel seed conveyors chains which are independent from each other, mounted on said central gears from which they extend in the form of a closed loop along the discharge conduit to the outlet port, and at least a pair of secondary conduits having a metered seed inlet and a metered seed outlet which is oriented towards the respective conveyor chain; providing at least one pair of sensors arranged adjacent to each side of said seed conveyor chains.

BRIEF DESCRIPTION OF DRAWINGS

For greater clarity and understanding of the object of the present invention, it has been illustrated in several figures, in which the invention has been represented in one of the preferred embodiments, all by way of example, wherein.

DETAILED DESCRIPTION OF THE INVENTION

Figure 1:
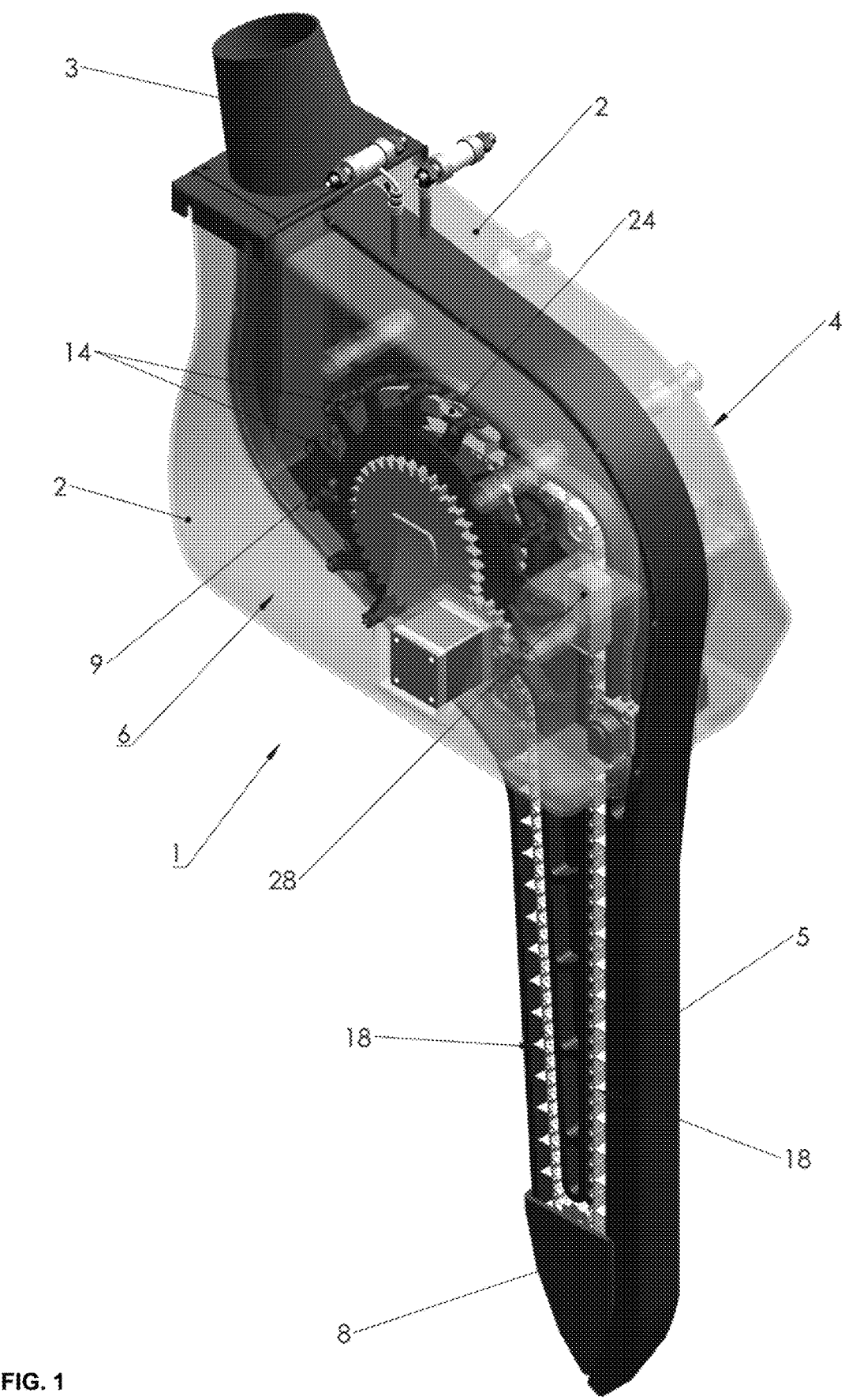
FIG. 1 shows a perspective view of the seed dispensing device of the present invention, wherein it has been illustrated on a transparent basis to show its interior.
Figure 2:
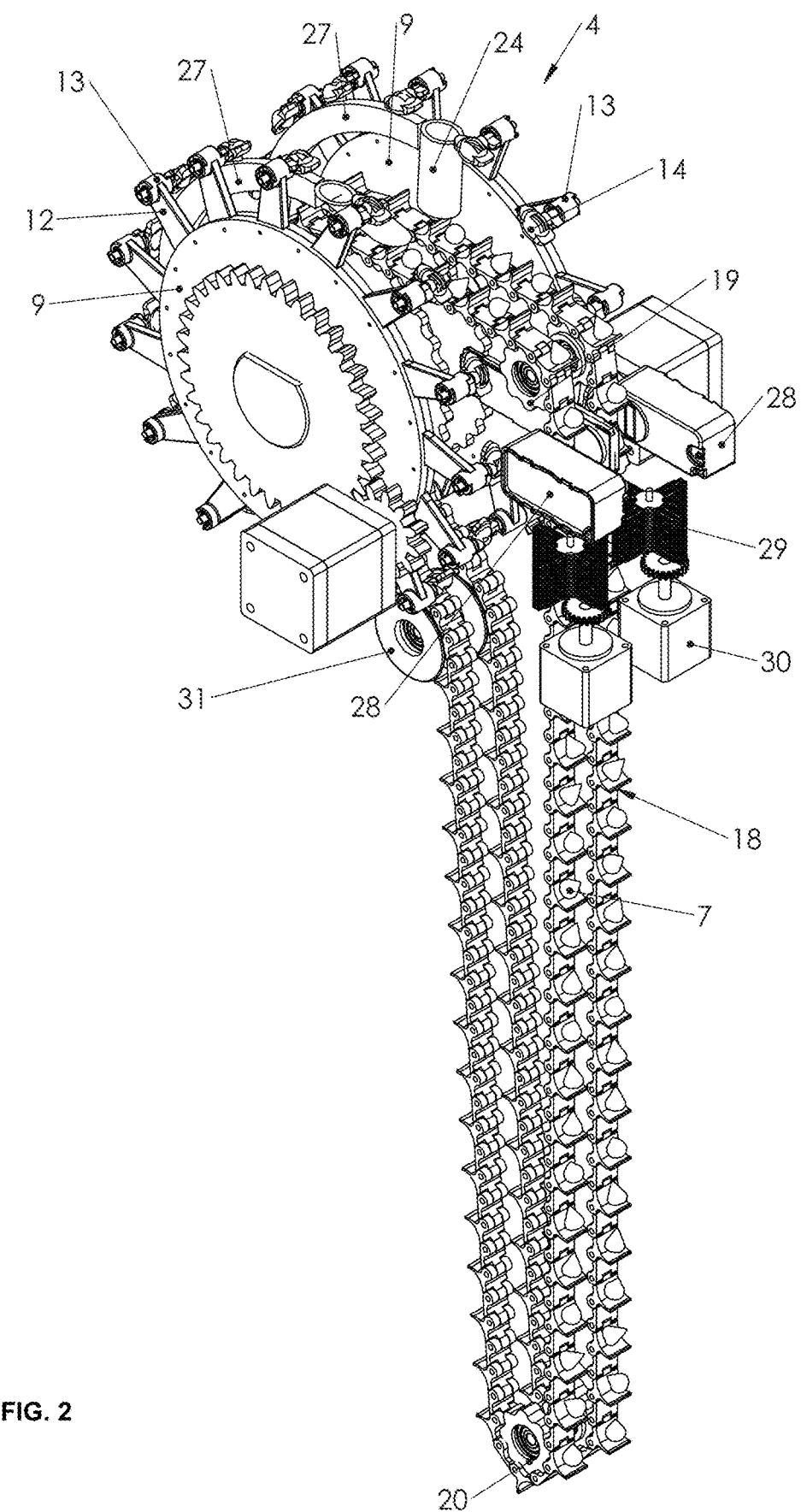
FIG. 2 shows a perspective and transparent view of the interior of the seed dispensing device of the present invention, wherein the parts comprising it can be observed.
Figure 3:
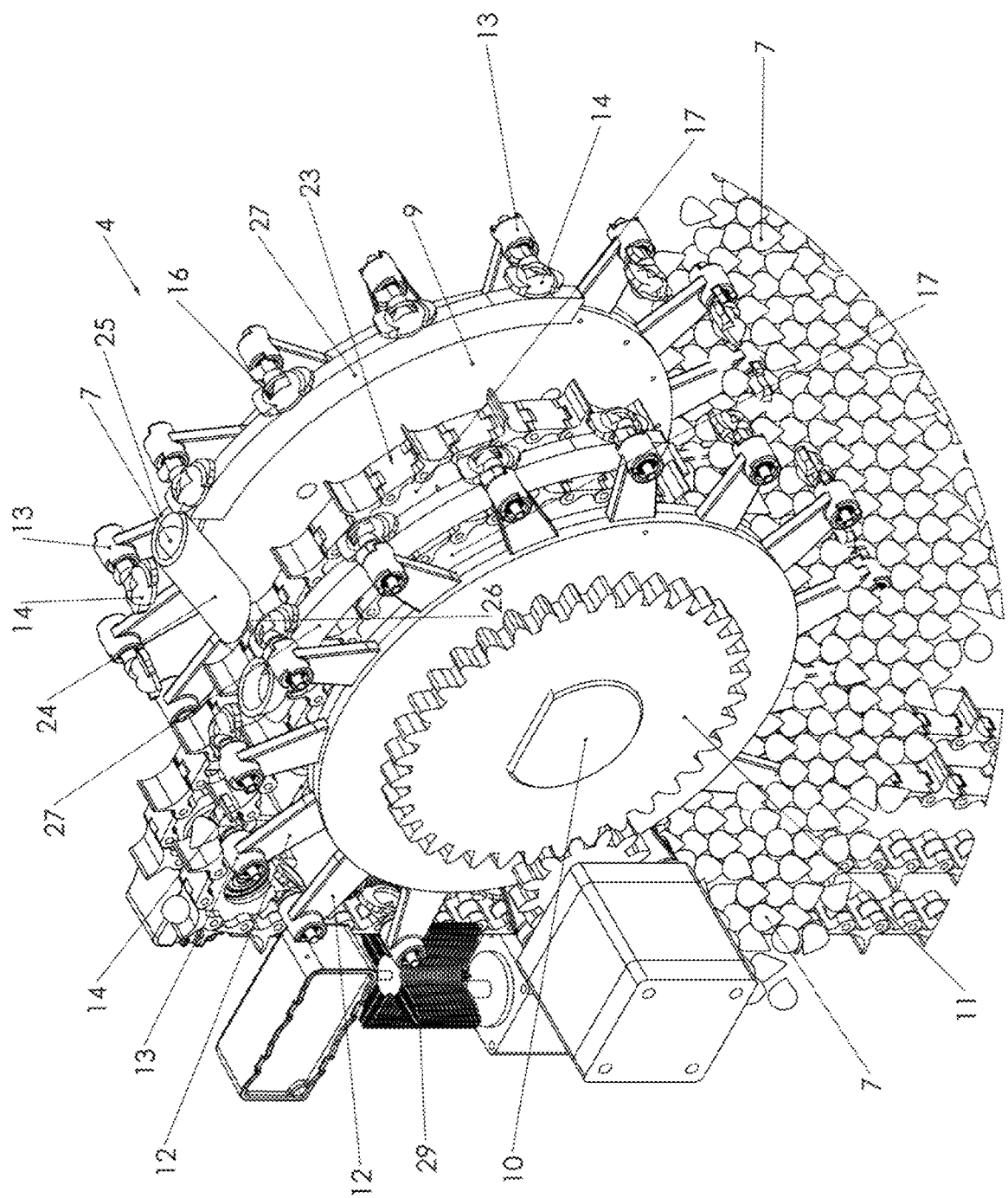
FIG. 3 shows a perspective and partial view of a metering device of the seed dispensing device according to the present invention.
Figure 4:
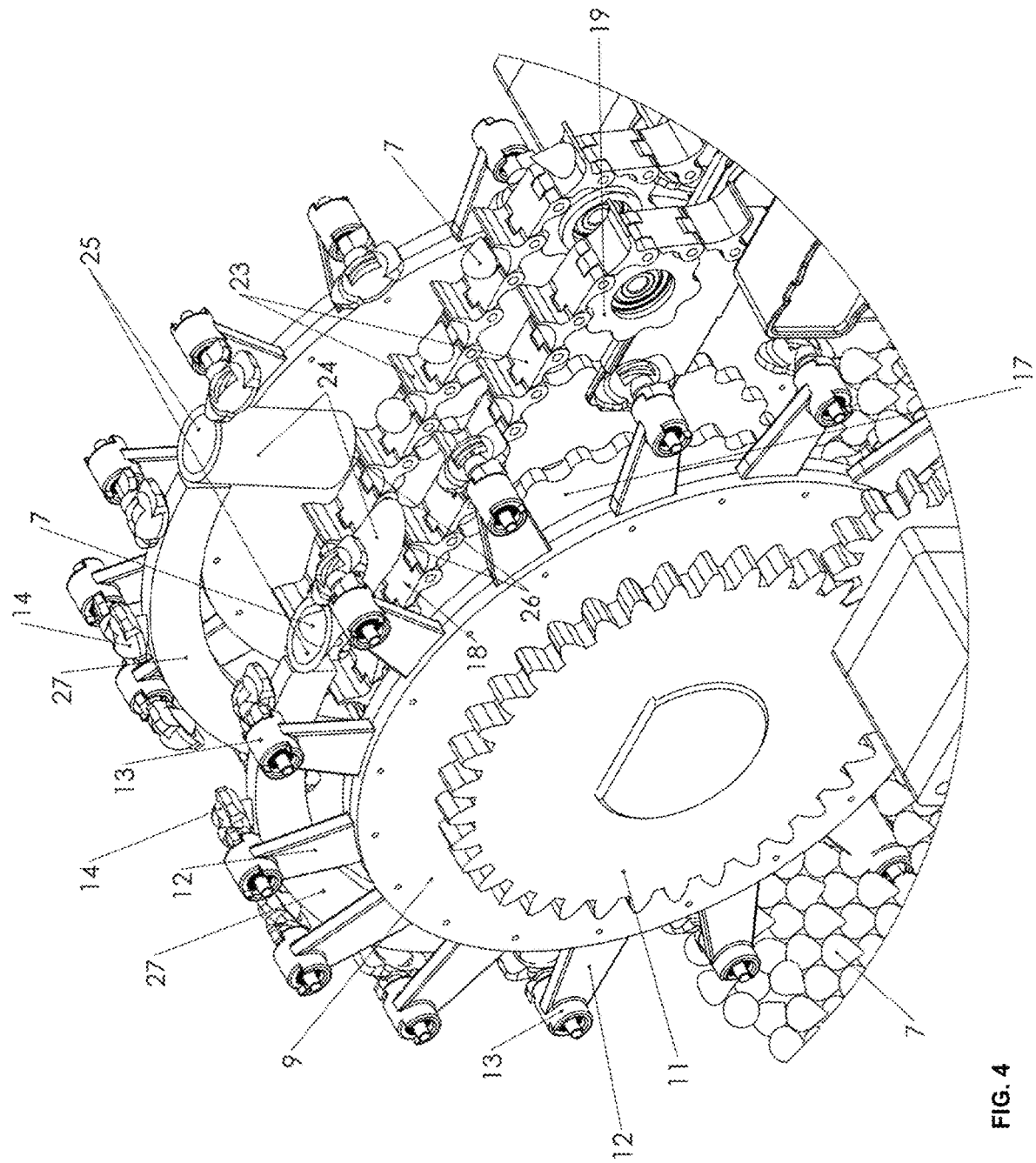
FIG. 4 shows still a perspective and partial view of the metering device according to the present invention.
Figure 5:
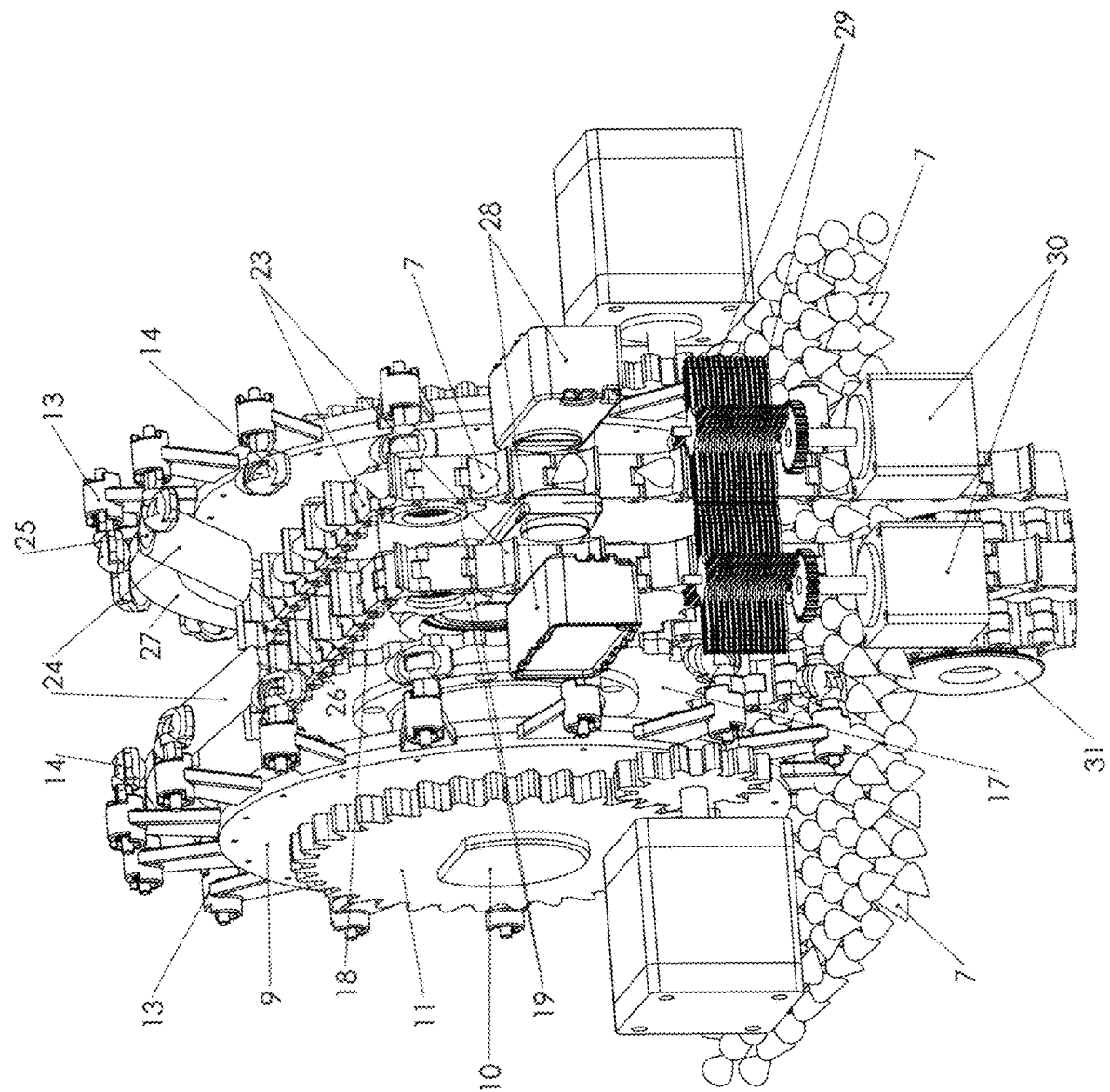
FIG. 5 shows still another perspective and partial view of the metering device of the present invention.
Figure 6:
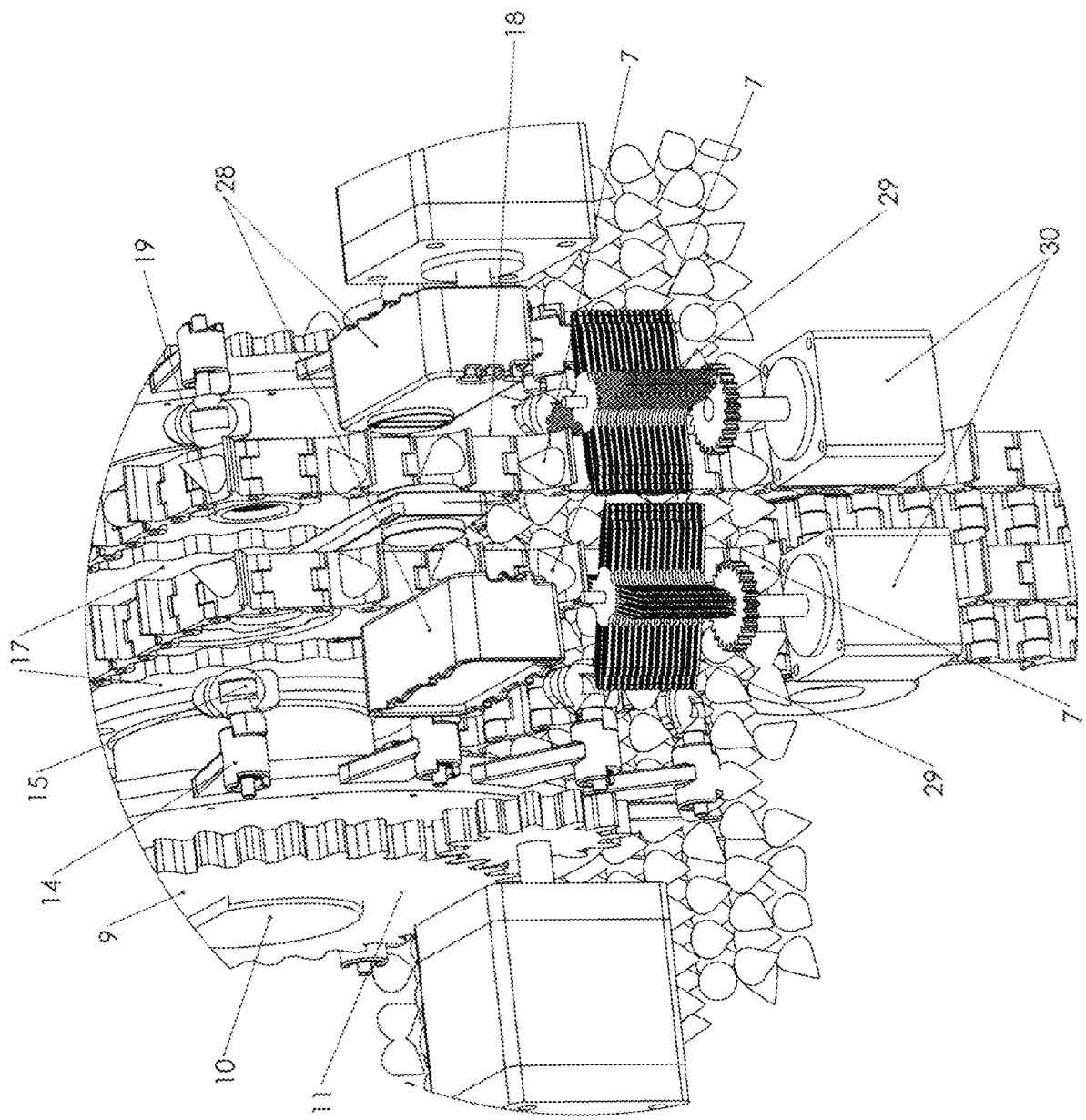
FIG. 6 shows a view even a perspective and partial view of the metering device according to the present invention, in which one can observe a pair of rotating blades that are discarding two seeds according to one of the possible application forms of the present invention.
Figure 7:
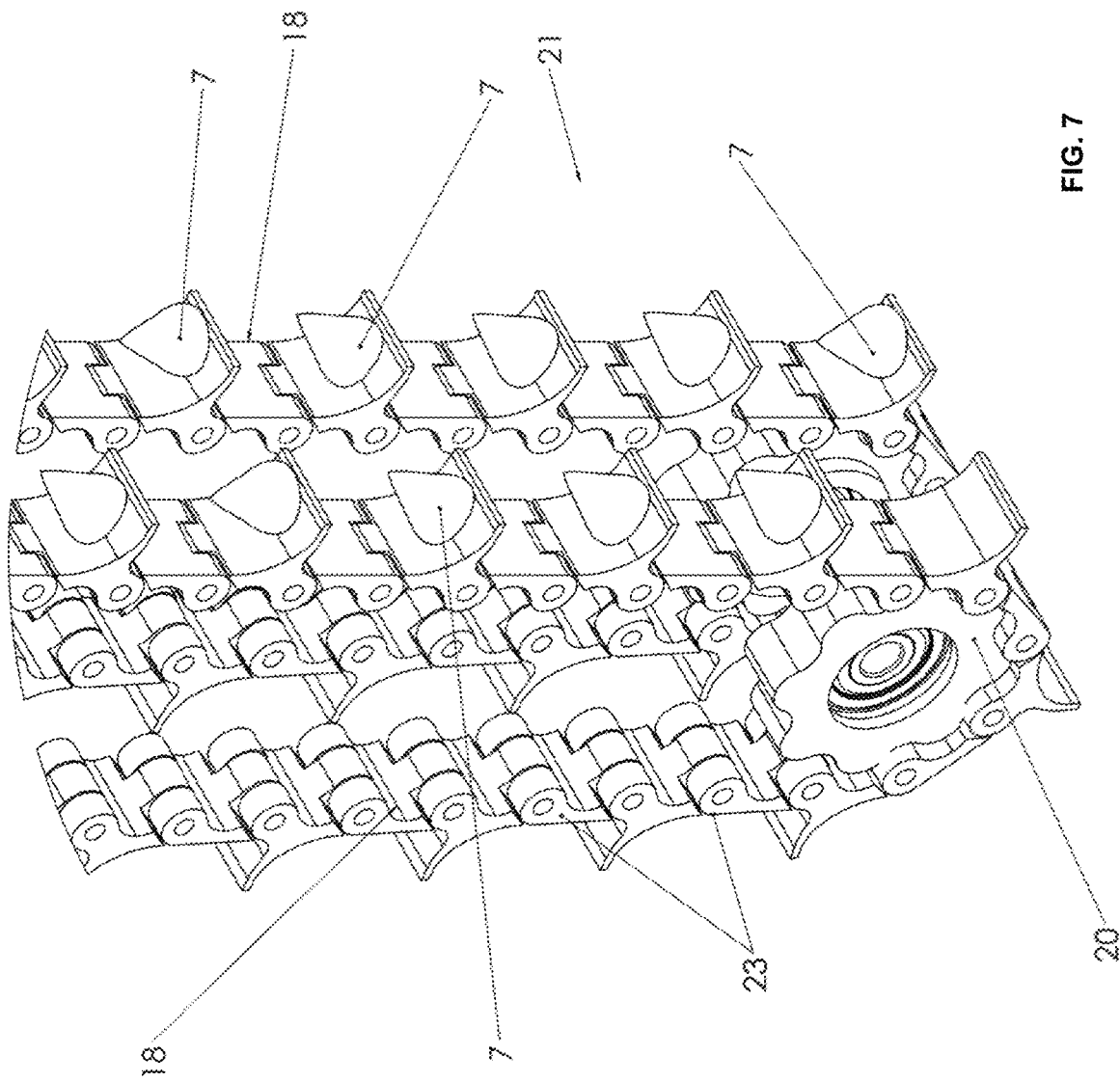
FIG. 7 shows a perspective and partial view of the lower end of a discharge conduit according to the present invention, where it has been illustrated on a transparent basis to allow the visualization of the parts that are arranged therein.

Referring now to the figures, it is seen that the invention consists of a new seed dispensing device for sowing machines that allows a continuous and synchronized sowing of seeds, depositing the seeds at the same separation distance, optimizing and thus providing a better sowing operation. Thus, and according to FIGS. 1 to 7, the seed dispensing device of the present invention is indicated by the general reference 1 and comprises two caps 2, a seed feeding inlet 3, a metering device 4 provided with a feeding device and a discharge conduit 5 or well known in the art as "sword". The feeding device, which will be described below, is responsible for placing the seeds in the metering device 4. A seed container 6 is arranged in the lower part of the dispensing device 1 so as to accumulate seeds 7 coming from the inlet 3, which will then be metered through the metering device 4 which takes the seeds from the feeding device and discharges them into the discharge pipe which outlet port 8 is oriented towards the respective furrow previously made on the surface.

Regarding the metering device 4, and more particularly the feeding device, it comprises a pair of independent rotating plates 9 which are arranged in parallel, spaced from each other and which are driven through the rotation of a respective rotating shaft 10 which in turn is driven through a set of gears 11 and electric motor (not illustrated). Each rotating plates 9 has on its perimeter a plurality of arms 12 arranged radially, which have a distal end 13 provided with at least one seed collecting means 14 which may comprise an access window or port 15 extending forming a container 16 which receives and partially houses a seed 7 taken from the seed container 6. The shape and dimensions of each container 16 allow single seed housing avoiding an overfeeding that could damage the continuous sowing process. In turn, the angle or position with which the collecting means are arranged will be such as to allow the taking and unloading of the seed without it falling according to what will be described below. It is further emphasized that the feeding device is not limited to that described above, but that other types of feeding devices can be considered and used in the present invention without any inconvenience.

On the other hand, the present invention provides at least two central gears 17 independent from each other, rotably mounted between said rotating plates 9 and driven by means of the corresponding rotating shaft 10, which in turn, drives the corresponding rotating plates 9. Likewise, there are at least two seed conveyor chains 18 parallel and independent from each other, mounted on said central gears 17 from which they extend in the form of a closed loop along, and inside, the discharge conduit 5 to the outlet port 8. The extension of the seed conveyors chains towards the discharge conduit 5 is carried out in a guided manner thanks to the arrangement of a pair of guide rollers 19. In turn, the conveyor chains 18 are guided in closed way and adjacent to the area of the outlet port, inside the discharge conduit through a lower roller 20, being guided in turn, prior to the dispensing device and from the discharge conduit, through a roller 31. In this way, the conveyor chains 18 move along a closed loop between the interior of the dispensing device and the discharge conduit.

Each conveyor chain 18 has a seed receiving face 21 which comprises a plurality of wedge-shaped links or sections 23 in which central portion there is provided a seed receiving seat 22. The wedge shape of each section 23 allows having contiguous and delimited spaces to temporarily store a single seed in each of them. On the other hand, the present invention is provided with at least a pair of secondary conduits 24 having a metered seed inlet 25 that receives the seeds housed in the collecting means 14 and a metered seed outlet 26 which is oriented towards the respective conveyor chain, more particularly towards the seed receiving face 21. Wherein, said secondary conduits 24 are arranged inclined above the central gears 17, with each access window or port 15 of the collecting means 14 passing adjacent thereto.

To prevent the seed from falling when being picked up by the collecting means 14 until it is discharged into the respective secondary conduit 24, there is provided a pair of curved seed guides 27 each extending from the metered seed inlet 25 of the secondary conduit 24 to a lower portion in a circumferential manner. The radius of curvature and the location of each curved guide 27 allow, in combination with the position angle of each seed collecting means 14, the seeds to move tangentially to the path of the curve defined by the guide 27. That is to say, access ports or windows of the collecting means pass in a slightly flush manner to said guides 27, preventing the seeds from falling until they reach the metered seed inlet 25 of each secondary conduit 24.

Likewise, the dispensing device of the present invention presents a pair of sensors 28 arranged adjacent to each side of said seed conveyor chains 18. The sensors 28 make it possible to identify whether the corresponding section 23 of the conveyor chain 18 has at least one seed 7. In case of having two seeds 7 together in a same section 23 of the conveyor chain, there are provided two rotating blades 29 acting as overloaded seed ejectors arranged on each side of the conveyor chains and below the sensors 28, said rotating blades 30 are driven by an electric motor 30. When the sensor 28 detects that there are two or more seeds in the same section 23, the electric motor 30 is driven to rotate the blade 29 one-quarter length and the latter discards both seeds 7, the section 23 being "empty".

As an alternative, not illustrated because it is a well-known mechanical device, an electric actuator can be arranged on each side of the chains instead of the blades. The actuator itself may consist of a cylinder and retractable/extensible stem driven, for example, by a solenoid mechanism. The aim of the extendable stem is to eject seeds from a cell or link of the corresponding chain. The concept is that, according to the invention, since there are two chains in parallel, it is preferable to have an empty cell than a cell overloaded with two or more seeds. The empty cell of one of the chains will be detected and the chain will be stopped in the unloading position while the other chain is put into operation.

It is emphasized that said sensors and electric motors are connected to a computerized central unit (not illustrated), which in turn indicates on a monitor the different sowing parameters and the information in real time of what is being sow n. In addition, electric motors responsible for driving the rotating blades and their chains are also controlled by the computerized central unit that regulates their speed based on previously loaded maps that represent the characteristics of the ground. Said computer, in turn, can be assisted by a GPS system with high positioning accuracy.

Thus, the seed dispensing device of the present invention is constituted and constructed, which allows a seed discharge in a constant and synchronized way, without altering the sowing distance between seeds. This is due to the arrangement of the two conveyor chains, which are operated completely independently depending on the circumstance, in combination with sensors and rotating blades. Thus, the present invention notably allows a better precision, reliability and greater efficiency in the grain placing and spacing in the furrow. It is noted that, the invention makes an electronic tracking of each seed and position until it is placed in the furrow, since for the electronics used in the present invention, the conveyor chains are a division of lockers—links—consecutive and numbered sections that have each a seed, several or none, and act accordingly.

In an exemplary but not limitative mode for the present invention, the dispensing device of the invention can operate in the following manner: at the start of the sowing time, one of the rotating plates 9 initiates the continuous loading of seeds and their metering in the ground, meanwhile the other rotating plate 9 loads seeds 7 on the chain 18 to the last position of the conveyor chain in the discharge conduit or sword 5 prior to the fall of the seed, at which point it stops. In the latter case, this positioning is achieved by counting the passage of a known quantity of seeds that corresponds to the amount that the chain can house between the position in which the seed sensor 28 is and the end of the discharge conduit or exit port 8. In order to carry out the seed loading 7, the rotating plate 9 rotates allowing each collecting means 14 to pick up a seed 7 from the seed container. While rotation continues, the conveyed seed passes through the seed guide 27 and falls into the metered seed inlet 25 of the secondary conduit 24 passing therethrough and falling into a section 23 of the conveyor chain 18.

In the case of a missing seed 7 in one of the sections 23 of the conveyor chain 18 of the rotating plate that is dosing seeds towards the furrows, this is detected by the seed sensor 28. When the absence of seed is detected, the rotating plate is stopped by starting the continuous dosing movement on the other rotating plate 9 in order to replace the missing seed in the conveyor chain of the first plate. In this circumstance, the process of positioning the first rotating plate 9 with seeds 7 on its chain until the end of the sword is started, being prepared for the eventual missing of seeds in the second rotating plate 9 which is now dosing and being sensed by the respective seed sensor 28. In the event that two or more seeds appear in the same link or section 23 of the conveyor chain, this status is detected by the sensors 23 which activate the movement into a quarter turn of the electric motor 30 integral with the rotating blades 29 which are seed ejectors that discard the two seeds present in the link of the conveyor chain and the sequence of replacement of that position is launched as if it were a case of seed shortage. That is, by discarding the two seeds, the sensor sends a signal to the computerized central unit so that section 23, which had the two seeds, is considered empty. When said section 23 is considered empty, the dispensing device operates as if the respective conveyor chain did not have any seed as described above.

In this way, there are two conveyor chains that allow the continuous metering of seeds towards the furrows. If one section or link of one of the conveyor chains is empty, the other chain already pre-loaded with seeds is driven to continue with the metering, allowing the chain 18 that had no seeds to position a section with seed subsequent to the one which was empty, adjacent to the outlet port 8, so as to allow metering in case the conveyor chain 18 that is currently in motion has some empty link or section. That is, the drive of the conveyor chains is mutually compensated in case they have an empty section, or with two seeds that were previously discarded by the rotating blades 29. The continuous metering of seeds is also achieved thanks to sensors 28 that constantly sense each link or section of the conveyor chains. Also, thanks to the secondary conduits 24-guides 27, the loading of a single seed per section 23 is ensured.

Figure 8:
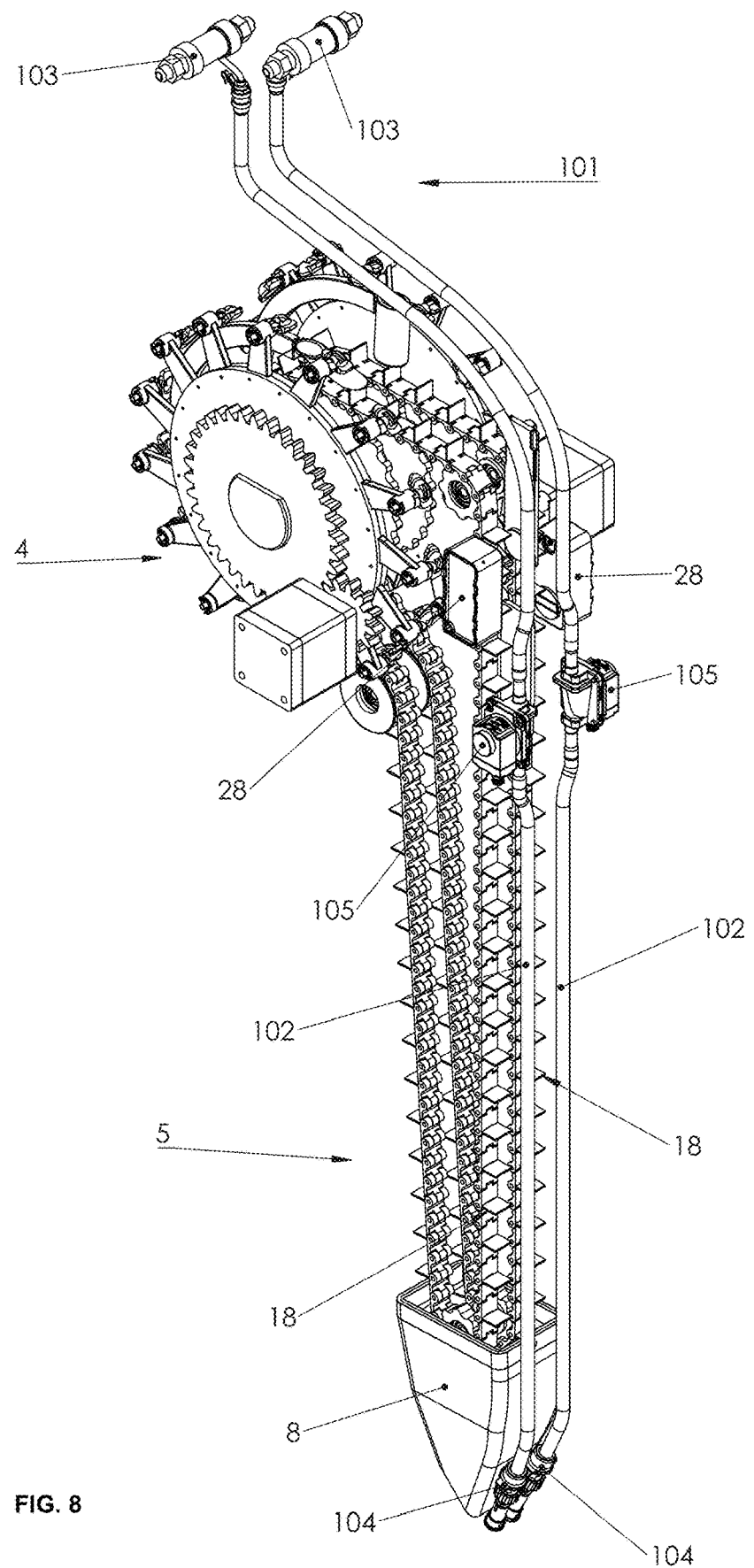
FIG. 8 shows a perspective view of an alternative embodiment of the device of the invention wherein a seed spraying system, comprising liquid sprayers and sprinklers, is provided to apply a product such as an inoculant or other product to the seeds in the zone where the seeds are dropped into the furrow.
Figure 9:
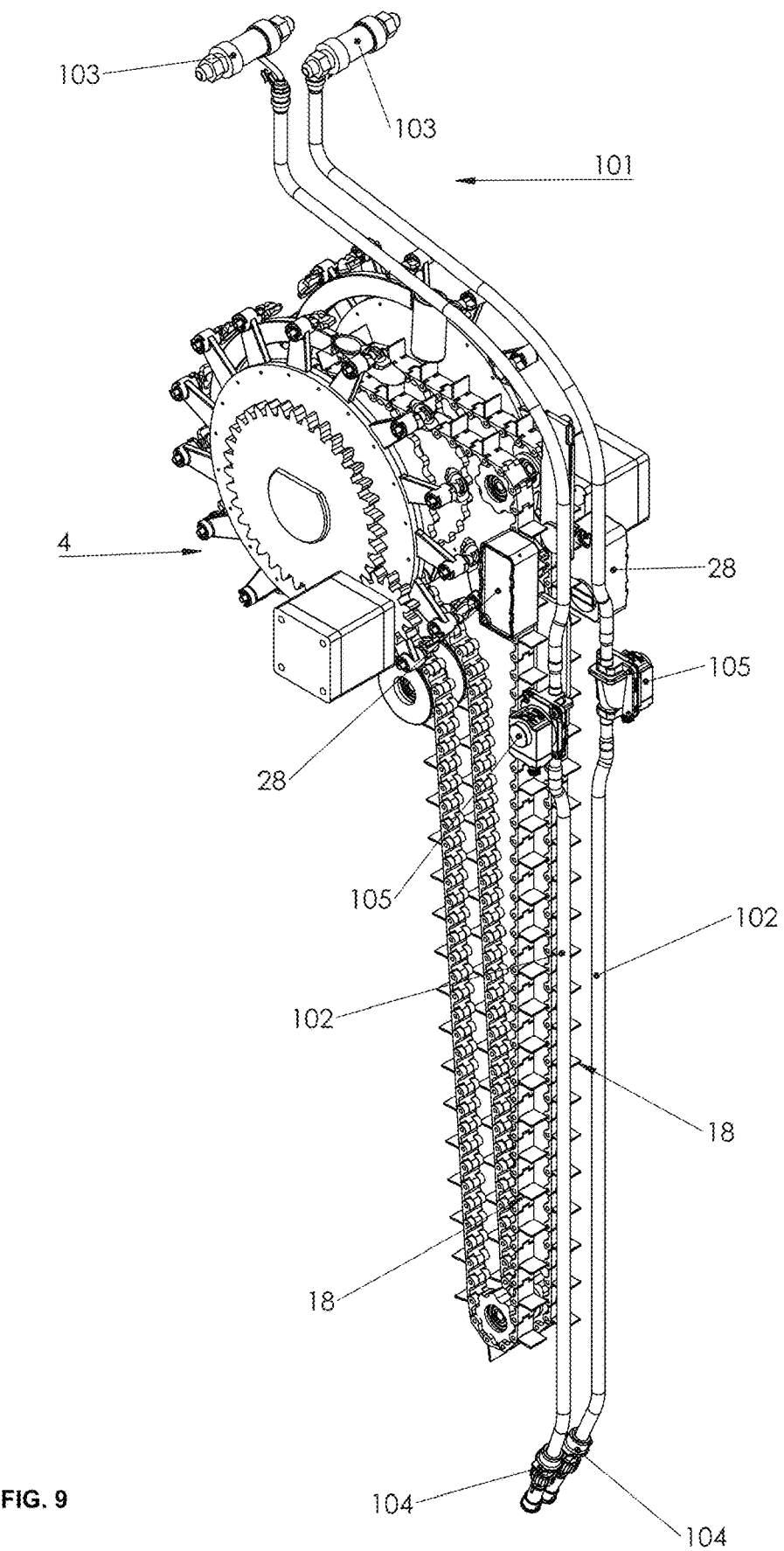
FIG. 9 is a perspective view of the embodiment of FIG. 8, where an outlet port or outlet protector has been removed for clarity purposes.

In a second embodiment shown in FIGS. 8, 9, the invention provides a seed spraying system 101, including liquid sprayers and sprinklers, comprising two or four product, such as liquid, liquid conveying conduits 102 extending parallel or along the seed distributor or seed metering device of the invention, from an upper portion of metering device 4 up to outlet port 8 of discharge conduit 5. More particularly, each of conduits 102 extends parallel or close to seed conveyor chains 18. Conduits 102 are connected, at the upper part thereof, by connection sleeves 103, to two or four circuits connected in turn to external containers containing agrochemical products or fertilizing products. At least an electro-valve 105 is mounted in an intermediate length of each conduit 102 and at least two or four ejecting nozzles 104, for spraying a treating product, are located at a lower end of discharge conduit 5, close to outlet port 8. Nozzles 104 are arranged close to the end of chain 18 run.

Seed spraying system 101 provides the spraying of each seed with an agrochemical and/or fertilizing product. To this purpose, electro-valves 105 receive an activation signal from a central computer unit which, based in the agronomic characteristics of the soil and the spraying product, activates the corresponding electro-valve 105 which in turn actuates the corresponding nozzle 104 to spray the corresponding product. The computer unit has the information, at all times, about which chain is dispensing the seeds. Thus the product is sprayed on the next seed or the seed that is being dispensed.

In this manner, the invented seed spraying system provides 101 provides the individual spraying of one or more treating products of different nature, such us agrochemicals or fertilizers, close to or onto each seed, thus preventing spraying the products over the soil as it occurs with conventional systems. Because the spraying is "punctual" onto each seed, no possibilities exist of generating "clouds" of the agrochemical product sprayed in the environment, avoiding thus the environmental contamination in areas around the seeding. This differs from the conventional methods which are well known in the art. It is clear that the term "agrochemical" must be understood as being any product employed in the agriculture and which is well known in the art, such as emerging agrochemicals and/or inoculants.

Seed spraying system 101 operates synchronically with the conveyor chains and the dispensing and metering device of the invention, thus optimizing the amount of treating product by hectare, thus increasing the benefits and advantages mentioned above in connection to seeding operations.

The present invention can be adapted without any inconvenience, to be equipped in precision seeders being able to work with fine grains and coarse grains, also being possible to dispense hybrids due to the design of the loading hopper and the electronic control of the computerized central unit.

I claim:

1. A seed dispensing device for sowing machines, comprising:

a seed feeding inlet in communication with a seed container capable of housing seeds to be sown into a furrow previously made on a seeding surface;

a seed metering device in communication with a discharge conduit, the discharge conduit having an outlet port which is oriented towards said furrow, at least two parallel and independent seed conveyor chains, each one of the at least two parallel and independent seed conveyor chains being mounted on a corresponding independent central gear, with each one of the at least two parallel and independent seed conveyor chains forming a closed loop, wherein the at least two parallel and independent seed conveyor chains being adjacent to each other to extend, along a part of the closed loop, within the discharge conduit up to the outlet port of the discharge conduit, and at least one pair of seed sensors; each seed sensor of said at least one pair of seed sensors arranged adjacent to a respective one of each side of said at least two parallel and independent seed conveyor chains, with each seed sensor being capable of detecting presence of seeds in said at least two parallel and independent seed conveyor chains, wherein said discharge conduit is provided with seeds by said at least two parallel and independent seed conveyor chains in a manner that when one of said at least two parallel and independent seed conveyor chains has no seed in a position at said outlet port, the other one of said at least two parallel and independent seed conveyor chains discharges the seed housed in the other one of said at least two parallel and independent seed conveyor chains.

2. The seed dispensing device of claim 1, wherein said at least two parallel and independent seed conveyor chains are guided towards the discharge conduit through two guide rollers.

3. The seed dispensing device of claim 2, wherein said at least two parallel and independent seed conveyor chains are guided towards the outlet port and inside the discharge conduit through a roller.

4. The seed dispensing device of claim 1, further comprising overfilled seed ejectors, wherein the overfilled seed ejectors are selected between rotating blades and electric seed ejecting actuators, arranged on each side of the at least two parallel and independent seed conveyor chains and below the seed sensors, said rotating blades being driven by an electric motor.

5. The seed dispensing device of claim 4, wherein said seed sensors and electric motor are connected to a computerized central unit.

6. The seed dispensing device of claim 1, wherein said at least two parallel and independent seed conveyor chains are fed with seeds by a feeder device comprising a pair of rotating plates independent from each other which are driven through a respective rotating shaft which in turn, is driven through an electric motor, a plurality of arms radially arranged on the perimeter of each rotating plate, which have a distal end provided with at least one means of collecting seeds, and at least a pair of secondary conduits having a metered seed inlet and a metered seed outlet which is oriented towards the respective at least two parallel and independent seed conveyor chain.

7. The seed dispensing device of claim 6, wherein said independent central gears on which said at least two parallel and independent seed conveyor chains engage are rotably mounted between said rotating plates and are driven by means of the corresponding rotating shaft.

8. The seed dispensing device of claim 7, wherein said at least one means of collecting seeds comprises a window or access port that extends forming a container which receives a seed from the seed container.

9. The seed dispensing device of claim 8, wherein said secondary conduits are arranged inclined above the central gears, and each access window or port of said at least one collecting means passes adjacent thereto, while each metered seed outlet is oriented adjacent to a seed receiving face of each one of the at least two parallel and independent seed conveyor chain.

10. The seed dispensing device of claim 9, further comprising a pair of curved seed guides extending each from the metered seed inlet of the secondary conduit to a lower portion in a circumferential manner, being in operative contact with the seeds deposited on the seed collecting means whose access ports or windows pass in a flush manner to said seed guides.

11. The seed dispensing device of claim 10, wherein said seed receiving face comprises a plurality of wedge-shaped sections or links which central portion is provided with a seed receiving seat.

12. The seed dispensing device of claim 1, further comprising a seed spraying system for spraying a treating product onto each seed that is being dispensed, the seed spraying system comprising at least two product conveying conduits extending close to the at least two parallel and independent seed conveyor chains and from an upper portion of the seed dispensing device up to the outlet port of the discharge conduit, each product conveying conduit including an electro-valve between an upper end connected to a product container and a lower end including at least an ejecting nozzle.

13. The seed dispensing device of claim 12, wherein said seed spraying system includes a pair of sensors for detecting the seed and activating the electro-valves and the ejecting nozzles.

* * * * *